United States Patent [19]

Van Vlaenderen

[11] 3,829,545

[45] Aug. 13, 1974

[54] PROCESS FOR MANUFACTURING POLYETHYLENE TEREPHTHALATE PLASTIC COATED WIRE

[75] Inventor: Roger Van Vlaenderen, Zwevegem, Belgium

[73] Assignee: N. V. Bekaert S.A., Zwevegm, Belgium

[22] Filed: Feb. 28, 1973

[21] Appl. No.: 336,799

Related U.S. Application Data

[62] Division of Ser. No. 108,355, Jan. 21, 1971, abandoned.

[52] U.S. Cl............. 264/174, 117/128.4, 117/232, 264/178 R, 265/237, 264/DIG. 65
[51] Int. Cl............................................. B29f 3/10
[58] Field of Search........ 264/174, 171, 173, 178 R, 264/237, 348, DIG. 65; 117/232, 128.4; 156/244

[56] References Cited
UNITED STATES PATENTS

| | | | |
|---|---|---|---|
| 1,862,947 | 6/1932 | Smith et al............... | 264/174 |
| 2,732,592 | 1/1956 | Tunnicliff et al......... | 264/174 |
| 2,956,305 | 10/1960 | Raydt et al............... | 264/174 |
| 3,579,379 | 5/1971 | Berkel et al.............. | 117/232 |
| 3,669,738 | 6/1972 | Cottis et al............... | 117/232 |

FOREIGN PATENTS OR APPLICATIONS 599,097 8/1946 Great Britain

*Primary Examiner*—Jeffery R. Thurlow
*Attorney, Agent, or Firm*—Edward J. Brenner

[57] ABSTRACT

An improved process for manufacturing plastic coated wire is taught which comprises heating the wire to be coated to an elevated temperature, passing the heated wire through an extrusion zone maintained at an elevated temperature and pressure in which a polyester plastic in molten condition is coated on the heated wire, and cooling the plastic coated wire at a rate sufficient to maintain the plastic primarily in the amorphous state. In a preferred embodiment, a steel wire is coated with polyethylene terephthalate in which the coating is at least 80 percent amorphous and 0.1 to 0.3 mm in thickness. An improved wire product is produced which may be advantageously utilized for the manufacture of barbed wire, wire mesh, wire netting, wire fences and the like.

3 Claims, 2 Drawing Figures

PROCESS FOR MANUFACTURING POLYETHYLENE TEREPHTHALATE PLASTIC COATED WIRE

CROSS-REFERENCE TO RELATED APPLICATION

This application is a division of my copending application, Ser. No. 108,355 filed on Jan. 21, 1971, now abandoned.

BACKGROUND OF THE INVENTION

1. Field of the Invention

The present invention relates to an improved process for the manufacture of plastic coated wire as well as an improved plastic coated wire and products manufactured from it. More particularly, the present invention relates to a process for the manufacture of steel wire coated by extrusion with polyethylene terephthalate as well as the polyethylene terephthalate coated steel wire and products manufactured from it.

2. Description of the Prior Art

Many types of coatings have been applied in the prior art for protecting wire surfaces from corrosion. However, none of these coatings have been completely satisfactory, particularly for coating wires which must be processed subsequently to produce manufactured products such as barbed wire, wire mesh, wire netting, wire fences and the like.

Galvanized metal coatings, for example, are expensive and are only temporarily corrosion resistant. A wide variety of plastic coatings for wires have been utilized but none of these have proven completely satisfactory. For example, during the past decade a polyvinyl chloride coating applied by extrusion has been employed. Although this type of plastic coating is generally sufficiently flexible to be utilized with wire, it is not sufficiently hard to undergo the mechanical processes in wire product manufacturing machines unless it is thicker than about 0.3 to 0.4 mm. The consequence is that the polyvinyl chloride coatings applied up to now have always been thicker than about 0.3 to 0.4 mm, thereby considerably increasing the cost of the coated wire product. Moreover, the adhesion of the polyvinyl chloride coating is not completely satisfactory, thus causing difficulties during the processing of wire in wire product manufacturing machines; e.g. the shifting of the coating over the wire. In order to overcome this difficulty a priming or ground layer of material may be laid down on the wire before the polyvinyl chloride is applied to thereby provide a greater adhesion between the wire and the polyvinyl chloride coating. While this has partially solved the adhesion problem it has increased the manufacturing cost of the coated wire product and furthermore has not avoided the problem of the need to utilize relatively thick polyvinyl chloride coatings.

In other prior art coating processes a wire may be passed through a vessel containing a plastic liquid synthetic material and drained through a nozzle in the bottom of the vessel. However, in such a process it is necessary to have the wire pass successively through a number of nozzles having different diameters which results in a process of increased manufacturing cost.

The use of polyethylene terephthalate as a coating for wire for electric conductors has been suggested in Dutch patent application No. 6704866. In an electrical conductor application the polyethylene terephthalate must be thermally resistant up to a temperature of at least about 100°C. Only a polyethylene terephthalate coating which has a considerable crystalline character can meet this particular requirement. These polyethylene terephthalate coatings of the prior art have been applied by what may be referred to as the "in-case" or "tube-on" method. Such polyethylene terephthalate coated products, however, have a number of disadvantages resulting from the fact that the crystalline structure of the coating does not impart enough toughness and hardness to be able to obtain suitable products for certain applications such as the manufacture of barbed wire, wire mesh, wire netting, wire fences and the like.

SUMMARY OF THE INVENTION

The present invention relates to an improved process for manufacturing plastic coated wire which comprises heating the wire to be coated to an elevated temperature, passing the heated wire through an extrusion zone maintained at an elevated temperature and pressure in which a polyester plastic in molten condition is coated on the heated wire, and cooling the plastic coated wire at a rate sufficient to maintain the plastic in the amorphous state. In a preferred embodiment of the invention a steel wire is coated with polyethylene terephthalate in which the coating is at least 80 percent amorphous and 0.1 to 0.3 mm in thickness. An improved wire product is produced which may be advantageously utilized for the manufacture of barbed wire, wire mesh, wire netting, wire fences and the like.

It is a primary object of the present invention to provide an improved plastic coated steel wire for use in the manufacture of barbed wire, wire fences, wire mesh, wire netting and the like.

It is a further object of the present invention to provide a coated wire product which is sufficiently tough, hard and flexible to be resistant to the deformations which coated wires undergo in machines for mechanically processing wire for the production of wire products (e.g. the twisting together of wires in a spiral head, the catching of wires with pliers, the formation of a wire between two gear wheels, etc.)

It is a still further object of the present invention to provide an improved coated wire which is resistant to weather and corrosion by providing a coating which adheres well to the wire surface.

It is a still further object of the present invention to provide a simple and economical process for manufacturing coated wire having improved properties.

BRIEF DESCRIPTION OF THE DRAWINGS

The present invention will be best understood by reference to the drawings in which.

DESCRIPTION OF THE PREFERRED EMBODIMENT

Figure 1:
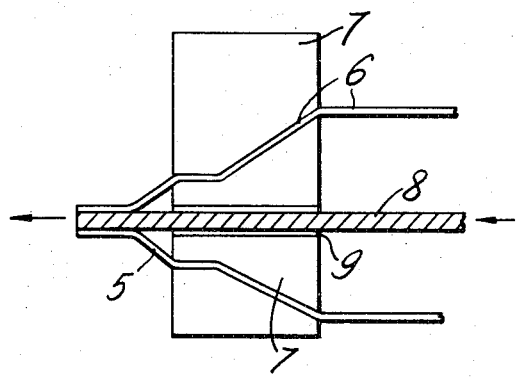
FIG. 1 is a schematic cross-section of an extrusion head for the application of the "tube-on" method for coating wires and, FIG. 2 is a schematic cross-section of an extrusion head for the application of the "pressure" method for coating wire.

FIG. 1 illustrates an apparatus and method for applying a plastic coating such as polyethylene terephthalate to a wire utilizing the "tube-on" method. In this method, a tube-formed layer 5 of polyethylene terephthalate 6 is formed first and afterwards it is drawn outside the extrusion head 7 on to the wire 8. In this particular process the speed of the wire 8 should be higher than the speed of the coating 5 coming out of the extrusion head 7. One of the problems of this particular process is that in many spots between the wire surface and the polyethylene terephthalate there are air bubbles formed which results in substantially reducing the adhesion of the wire to the plastic. In order to avoid this, air should be withdrawn through outlet 9 from the extrusion head 7. This is, however, a very cumbersome operation. The coating applied by the technique shown in FIG. 1 produces a coating of relatively high crystallinity which is relatively inflexible. Another disadvantage is that the surface of the applied coating is not smooth.

Figure 2:
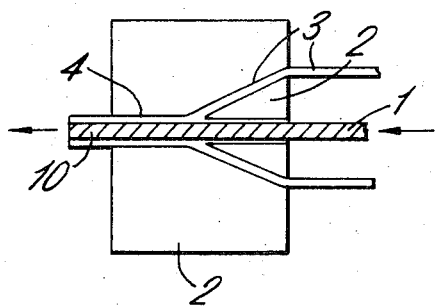

The "pressure" method of producing a plastic coated wire in accordance with the present invention is illustrated in FIG. 2. In this technique a heated wire 1 is passed through extrusion head 2 in which molten plastic 3 at an elevated temperature is extruded under pressure to form a coating 4 on wire 1 to thereby produce coated wire 10. The wire 1 may be heated by any conventional technique such as by electrical heating, heating with steam in a heating chamber, induction heating and the like. Wire 1 may be continuously passed from a storage spool to the heater and then to the extrusion head 2 of the extrusion machine. In such a continuous operation the preheating of the moving wire is carried out on a continuous basis. In general, it is preferred to preheat the wire between 100° to 200°C, preferably between 130° and 170°C, and more preferably between 150° and 170°C so as to considerably decrease the internal stresses in the product coating. The preheating also removes humidity and lubricants from the wire surface.

The extrusion head 2 includes a discharge nozzle or mouth piece through which the coated wire 10 is discharged. At its other end extrusion head 2 is provided with a conical cavity in which is disposed a conical surface-shaped rotation-symmetrical wedge for the passage of the molten plastic such as polyethylene terephthalate. The molten plastic 3 is heated to a molten state in the range of 200° to 300°C, preferably 250° to 270°C and fed by conventional techniques into extrusion head 2. More particularly, the plastic in the form of grains may be passed through a funnel into the grooves of an Archimedes screw, revolving in a heated cylinder. By this means the plastic may be passed to the extrusion head 2, while it becomes more and more plastically deformable. The heating elements are arranged in such a way as to effect a systematic temperature control on the plastic. The screw is constructed in such a way that the plastic is pushed forward while at the same time the plastic is being increasingly compressed. The thickness of the applied coatings of plastic to the wire may be regulated by utilizing extrusion heads of different sizes as well as by controlling the pressure produced by the Archimedes screw.

After passing out of the extrusion head 2, the coated wire 10 is cooled down at a rapid rate such that the applied plastic coating on the wire is primarily amorphous. Thus after the extrusion step the coated wire 10 is preferably immediately passed into a cooling liquid such as cold water to quench the coated wire 10. The cooling rate will depend in part on the relation of the wire diameter to the coating thickness as well as to the temperature of the cooling medium. Thus the thicker the diameter of the coated wire the lower the temperature of the cooling medium should be. Normally, however, for the purposes of the present invention quenching the heated coated wire in a bath of cold water will be sufficient to accomplish the necessary quenching. In accordance with the present invention the coated plastic wire is cooled down by chilling it in sufficiently cold water to obtain a plastic coated steel wire of which the coating is preferably at least 80 percent amorphous and has a thickness in the range of about 0.1 to 0.3 mm. Generally the cooling vessel should be long enough so that when the wire flows out of the cooling vessel the temperature of the coating should be sufficiently low (preferably below about 155°C) to enable it to be coiled up without damaging the coated wire.

The present invention is particularly advantageously used for coating steel wire of the type utilized in the manufacture of barbed wire, wire mesh, wire netting, wire fences and the like. The plastic coating prevents corrosion of the steel wire when exposed to the atmosphere or other corrosive media. The present invention is also applicable to the coating of other metal wires, such as, for example, copper wire, aluminum wire and the like. The present invention is particularly applicable to metal wires having a diameter greater than 1 mm.

Although polyethylene terephthalate is the preferred plastic coating material of the present invention, other polyester plastic coatings may be utilized, namely coatings which are polymers of dicarboxylic acids and glycols. For example, isophthalic acid may be utilized instead of terephthalic acid and other glycols may be utilized other than ethylene glycol. Also mixtures of polymers of different dicarboxylic acids and glycols may be utilized as well as mixtures of such polyesters with other plastic materials.

The following is a specific example of the present invention. A bright steel wire with a diameter of 1.8 mm was preheated up to 150°C and was drawn through an extrusion head of the type shown in FIG. 2 at a speed of 150 meters per minute. The extrusion machine employed, of which the aforementioned extrusion head was a part, was equipped with an extrusion cylinder in which an Archimedes screw revolved. The diameter of the extrusion cylinder was 45 mm while the length to diameter ratio was 26. The temperature of the cylinder was maintained at its inlet end at 230°C, in its middle at 310°C, and at the feed end (just before the extrusion head) at 300°C. The extrusion head itself which was fed by the screw was also maintained at a temperature of 300°C. The screw was of a type that has been used to apply nylon on blank wire. The screw which was not cooled had a compression ratio of 3.5 (that is the ratio between the pressure at the extrusion head and the pressure at the feed end).

Polyethylene terephthalate in the form of grains was introduced into the extrusion cylinder and had a temperature of 260°C when leaving the extrusion machine. The coated wire was passed through air for a length of 1 meter and then for a length of 4 meters through a vessel containing water at ambient temperature so that the coating was very rapidly brought down below 155°C. It was found that this was necessary in order to maintain the plastic in primarily the amorphous state. The resultant coating which had a thickness of 0.1 mm exhibited a substantial degree of toughness. Also after repeated flexions of the wire the coating was not damaged.

Next the test was repeated in which the wire was not preheated. In this case a coated wire was obtained which had a hard brittle coating and which burst after one bending.

The coated wire obtained by the process of the present invention (particularly wire coated with amorphous polyethylene terephthalate) is especially well adapted for many industrial applications. The main properties of the coating are (1) a higher hardness than the polyvinyl chloride coatings of the prior art, (2) a high degree of flexibility, (3) resistance to water absorption, (4) better mechanical properties, such as a higher modulus of elasticity, and (5) a particularly excellent adhesion of the coating to the wire surface. Due to these outstanding properties it has now been found possible to use coating with thicknesses of 0.1 to 0.2 mm for major industrial applications such as barbed wire, wire fences, wire mesh, and wire netting. Further, it has been found that such coated wire can be successfully processed in conventional wire product manufacturing machines.

Coated wires of the present invention also demonstrate increased resistance to corrosion and formation of rust during the lifetime of the products. As the adhesion is much better and as the water absorption is smaller the possibility of formation of rust is practically excluded. The formation of rust which takes place between the coating and the metal surface is one of the main causes of the peeling of the wire coating during its lifetime. This has been especially true in the case of thin (0.1 to 0.2 mm) polyvinyl chloride coatings. The polyethylene terephthalate coated wire product of the present invention having a coating thickness of only about 0.1 to 0.2 mm has been found to be as good as relatively thick polyvinyl chloride coatings of 0.4 to 0.5 mm for the production of such products as barbed wire, wire fences, wire mesh, wire netting and similar products manufactured from wire. Thus the manufacturing cost of the coated wires of the present invention is considerably cheaper than the aforementioned polyvinyl chloride coatings since a substantially lesser amount of the expensive plastic coating material is required.

It will be apparent that the embodiment described above is only exemplary and that various modifications can be made in operation, design and utilization within the scope of the invention as defined in the appended claims.

What is claimed is:

1. An improved process for manufacturing polyethylene terephthalate coated wire for use in the manufacture of barbed wire, wire netting, wire fence and the like which comprises preheating a wire to be coated to a temperature in the range of about 100° to 200°C, said wire having a diameter greater than 1 mm., passing said preheated wire through an extrusion zone maintained at an elevated temperature and pressure in which polyethylene terephthalate in molten condition is coated on said wire to a thickness ranging from 0.1 to 0.3 mm. by means of a pressure method, and immediately quenching said polyethylene terephthalate coated wire at a rate sufficient to maintain said polyethylene terephthalate in the amorphous state.

2. Process according to claim 1 in which said extrusion is carried out at a temperature in the range of about 200° to 300°C and said polyethylene terephthalate coated wire is cooled by quenching in cold water.

3. Process according to claim 1 in which an extrusion head is used which includes a nozzle through which said polyethylene terephthalate coated wire is withdrawn and a conical wedge provided with a central bore disposed within a corresponding cavity at the other end of said head, said extrusion head being adapted to feed said wire through said central bore and molten polyethylene terephthalate through a conical passageway defined by the outer surface of said wedge and the interior conical surface of said head at said other end.

* * * * *